US008822581B2

(12) United States Patent
Van der Wal et al.

(10) Patent No.: US 8,822,581 B2
(45) Date of Patent: Sep. 2, 2014

(54) MELT DISPERSION PROCESS FOR MAKING POLYMER POLYOLS

(75) Inventors: Hanno R. Van der Wal, Hoek (NL); Ronald Wevers, Terneuzen (NL); Freddy Van Damme, Bruges (BE); Francois M. Casati, Pfaffikon (CH); Georges Kanaan, Molenbeek-Saint-Jean (BE); Fernand Pla, Nancy (FR); Sandrine Hoppe, Nancy (FR); Bart Noordover, Terneuzen (NL); Christian Fonteix, Nancy (FR)

(73) Assignee: Dow Global Technologies LLC, Midland, MI (US)

( * ) Notice: Subject to any disclaimer, the term of this patent is extended or adjusted under 35 U.S.C. 154(b) by 596 days.

(21) Appl. No.: 12/996,585

(22) PCT Filed: Jun. 18, 2009

(86) PCT No.: PCT/US2009/047808
§ 371 (c)(1),
(2), (4) Date: May 17, 2011

(87) PCT Pub. No.: WO2009/155427
PCT Pub. Date: Dec. 23, 2009

(65) Prior Publication Data

US 2011/0213044 A1 Sep. 1, 2011

Related U.S. Application Data

(63) Continuation of application No. 61/073,953, filed on Jun. 19, 2008.

(51) Int. Cl.
*C08K 5/053* (2006.01)

(52) U.S. Cl.
USPC ........... 524/386; 524/487; 524/502; 524/761; 525/50; 525/55; 525/242; 525/298

(58) Field of Classification Search
USPC .................. 528/403; 524/386, 487, 502, 761; 525/50, 55, 242, 298
See application file for complete search history.

(56) References Cited

U.S. PATENT DOCUMENTS

| | | | | |
|---|---|---|---|---|
| 3,538,043 | A * | 11/1970 | Herold | 525/449 |
| 4,745,153 | A * | 5/1988 | Hoffman | 524/762 |
| 5,321,077 | A * | 6/1994 | Hayes et al. | 525/63 |
| 5,494,957 | A * | 2/1996 | Moore et al. | 524/504 |
| 5,854,386 | A * | 12/1998 | Shen et al. | 528/403 |
| 6,013,731 | A * | 1/2000 | Holeschovsky et al. | 525/123 |
| 6,472,447 | B1 * | 10/2002 | Lorenz et al. | 521/137 |
| 6,613,827 | B2 | 9/2003 | Lundgard | |
| 2005/0085613 | A1 * | 4/2005 | Adkins et al. | 528/44 |
| 2011/0065840 | A1 * | 3/2011 | Freidank et al. | 524/5 |

* cited by examiner

*Primary Examiner* — John Cooney
(74) *Attorney, Agent, or Firm* — Gary C Cohn PLLC

(57) ABSTRACT

Polystyrene is dispersed into a polyol via a mechanical dispersion process. A stabilizer is present to stabilize the dispersed polymer particles. The stabilizer includes a copolymer of (1) from 10 to 70% by weight of a branched polyol which has a molecular weight of from 4000 to 20,000, from 0.2 to about 1.2 polymerizable ethylenically unsaturated groups per molecule and from about 3 to about 8 hydroxyl groups per molecule with (2) from 30 to 90% by weight of styrene or a mixture of styrene and one or more other low molecular weight monomers.

9 Claims, No Drawings

MELT DISPERSION PROCESS FOR MAKING POLYMER POLYOLS

This invention relates to methods for making dispersions of polymer particles in a polyol.

So called "polymer polyols" (sometimes known as "copolymer polyols") are well known materials. They have a continuous phase made up of one or more compounds having multiple hydroxyl groups. Particles of another polymer are dispersed in the polyol phase. Common dispersed phase particles are styrene polymers and copolymers (including styrene-acrylonitrile polymers), polyurea polymers and polyurethane-urea polymers, among others.

Polymer polyols have been manufactured for decades by polymerizing the disperse phase polymer directly within the continuous polyol phase. An advantage of making polymer polyols in this way is that the particles can be prepared directly at the desired particle size. However, the process has certain disadvantages. These include the formation of oligomeric species that may migrate to the continuous phase and increase its viscosity. It is often difficult to control the degree of grafting that occurs between the disperse phase polymer and the continuous polyol phase. In addition, the polymerization process requires that various additional materials, such as free radical initiators, chain transfer agents, etc. be added into the process. These materials or their degradation products can remain in the polymer polyol product.

Another potential approach to manufacturing polymer polyols is to polymerize the discontinuous phase polymer separately, and then disperse the polymer into the polyol. It is thought that this approach could offer economical advantages, because the discontinuous phase polymer could be made in an inexpensive bulk polymerization process. Better molecular weight control may be possible in bulk polymerization processes. Unwanted grafting between the dispersed polymer and the polyol phase can be reduced or avoided. The practical problem is that is very difficult to disperse the polymer particles into the polyol at the desired particle size and with a somewhat uniform molecular weight distribution.

One way of dispersing a previously-formed polymer into a polyol is to make a fine powder of the polymer, and disperse the powder into the polyol. It is very difficult, in the first instance, to inexpensively form the polymer into such a fine powder, especially at a somewhat uniform particle size and, in the second instance, to disperse the powder evenly into the polyol. For these reasons, methods of this type have little commercial value.

Another way of dispersing the previously-formed polymer is to melt it, and then blend the molten polymer with the polyol under shear. The shearing action breaks the molten polymer into small droplets which become dispersed in the polyol phase. Upon cooling, a dispersion of polymer particles is formed. This approach is described in U.S. Pat. No. 6,613,827. That patent describes a process wherein a previously-formed polymer is melted in an extruder, mixed in the extruder with a surfactant and a polyether polyol, and subsequently mixed with more of with the polyether polyol. The mixture is then cooled to solidify the particles.

U.S. Pat. No. 6,613,827 states that stabilizers are required to make a stable dispersion, if the disperse phase polymer is not self-dispersing. That patent mentions that the stabilizer may be anionic, nonionic, cationic or polymeric or some combination thereof. A suitable stabilizer for polyethylene particles is said to be a reaction product of a maleic anhydride-modified polyethylene and a monoamino polyol. Another suitable stabilizer is described as a reaction product of an ethylene-acrylic acid copolymer and a monoamine polyol. However, the acid values in these stabilizers can deactivate organotin catalysts when these polymer polyol products are later used to make polyurethanes.

Dispersions of polystyrene in polyols are of interest, because polystyrene functions very well as a disperse phase material in polyurethane foam applications. In the conventional manufacturing approach, styrene monomer is polymerized in situ in the continuous polyol phase. The resulting polystyrene particles are very difficult to stabilize. The particles tend to settle out from the product. Various types of stabilizers have been used in these products to try to stabilize them. Some of these are described, for example, in U.S. Pat. Nos. 4,640,935, 4,588,830, 4,513,124, 5,081,180 and 4,745,153, and EP1675885. U.S. Pat. No. 4,745,153 describes a preformed dispersant that is made by polymerizing a vinyl-capped polyol with up to about 10 weight percent of a monomer such as styrene or acrylonitrile. Even when such stabilizers are used, it is very difficult to form a stable dispersion of polystyrene particles. Commercial products almost uniformly copolymerize some acrylonitrile with the styrene in order to form a stable dispersion. Acrylonitrile grafts readily to the polyol continuous phase to provide additional stabilization, but this grafting often leads to the formation of polyol-soluble styrene-acrylonitrile species which increase the viscosity of the product. The nitrile groups also can cause yellowing.

Therefore, it would be desirable to provide a useful method for making dispersions of polystyrene polymers in polyols.

This invention is a method for making a polymer polyol, comprising (a) mixing a melted thermoplastic polystyrene polymer with a liquid polyol in the presence of a stabilizer under conditions sufficient to disperse the polystyrene polymer in the form of droplets within a continuous phase of the liquid polyol and (b) cooling the droplets to solidify the polystyrene polymer, wherein the stabilizer includes a copolymer of (1) from 10 to 70% by weight of a branched polyol which has a molecular weight of from 4000 to 20,000, from 0.2 to about 1.0 polymerizable ethylenically unsaturated groups per molecule and from about 3 to about 8 hydroxyl groups per molecule with (2) from 30 to 90% by weight of styrene or a mixture of styrene and one or more other low molecular weight monomers.

A preferred stabilizer includes from 20 to 80% by weight of the copolymer and from 80 to 20% by weight of one or more carriers, as described more fully below.

In another aspect, this invention is a copolymer of (1) from 10 to 70% by weight of a branched polyol which has a molecular weight of from 4000 to 20,000, from 0.2 to about 1.0 polymerizable ethylenically polymerizable groups per molecule and from about 3 to about 8 hydroxyl groups per molecule with (2) from 30 to 90% by weight of styrene or a mixture of styrene and one or more other low molecular weight monomers.

In yet another aspect, this invention is a dispersion of from 20 to 80% of A) a copolymer of (1) from 10 to 70% by weight of a branched polyol having a molecular weight of from 4000 to 20,000, from 0.2 to about 1.0 polymerizable ethylenically polymerizable groups per molecule and from about 3 to about 8 hydroxyl groups per molecule with (2) from 30 to 90% by weight of styrene or a mixture of styrene and one or more other low molecular weight monomers in B) from 80 to 20% of one or more carriers.

In a further aspect, the invention is related to a composition for the preparation of a polyurethane foam wherein the is uses a polymer polyol, a polyurethane catalyst, an organic isocyanate and a surfactant and a blowing agent characterized in that the polymer polyol comprises a polymer polyols as described above.

In yet another aspect, the invention relates to a foam prepared by the reaction of an organic polyisocyanate with a polymer polyol wherein the polymer polyol comprises a polymer polyol as described above.

In still another aspect, the invention relates to a foam prepared by the reaction of an organic polyisocyanate with a polyol composition wherein the polyol composition comprises from 20 to 90 weight percent of polymer polyol as described above.

The invention provides an efficient and economical process by which polystyrene polymers can be stably dispersed into polyols to form copolymer polyol products. The presence of the stabilizer allows the polystyrene to be formed into droplets which can be stably dispersed into the polyol. The droplets, once cooled to form particles, remain dispersed in the polyol and are resistant to settling. The process works well even with polystyrene homopolymers, which are difficult to stabilize in conventional polymer polyol manufacturing processes. The process can also be used to stabilize particles of various styrene copolymers.

The polyol that forms the continuous phase in the polymer polyol product is an organic material or mixture of organic materials that is a liquid at room temperature (25° C.) and which contains an average of at least 1.5 isocyanate-reactive groups per molecule. For purposes of this invention, the term "polyol" is used as a shorthand term for such materials, even though the actual isocyanate-groups in a particular case are not necessarily hydroxyl groups. The liquid polyol preferably contains an average of from 1.8 to 8 isocyanate-reactive groups/molecule, especially from 2 to 4 such groups. The isocyanate-reactive groups are preferably aliphatic hydroxyl, aromatic hydroxyl, primary amino and/or secondary amino groups. Hydroxyl groups are preferred. Hydroxyl groups are preferably primary or secondary hydroxyl groups.

The equivalent weight of the polyol per isocyanate-reactive groups will depend on the intended applications. Polyols having an equivalent weight of 400 or greater, such as from 400 to 3000, are preferred for forming elastomeric polyurethanes such as slabstock or molded polyurethane foams, microcellular polyurethane elastomers and non-cellular polyurethane elastomers. Lower equivalent weight polyols, such as those having an equivalent weight of from 31 to 399, are preferred for making rigid polyurethane foams and structural polyurethanes.

Preferred types of liquid polyol(s) include polyether polyols, polyester polyols, and various types of polyols that are prepared from vegetable oils or animal fats.

Polyether polyols include, for example, polymers of propylene oxide, ethylene oxide, 1,2-butylene oxide, tetramethylene oxide, block and/or random copolymers thereof, and the like. Of particular interest are poly(propylene oxide) homopolymers; random copolymers of propylene oxide and ethylene oxide in which the poly(ethylene oxide) content is, for example, from about 1 to about 30% by weight; ethylene oxide-capped poly(propylene oxide) polymers; and ethylene oxide-capped random copolymers of propylene oxide and ethylene oxide. The polyether polyols may contain low levels of terminal unsaturation (for example, less that 0.02 meq/g or less than 0.01 meq/g). Examples of such low unsaturation polyether polyols include those made using so-called double metal cyanide (DMC) catalysts, as described for example in U.S. Pat. Nos. 3,278,457, 3,278,458, 3,278,459, 3,404,109, 3,427,256, 3,427,334, 3,427,335, 5,470,813 and 5,627,120. Polyester polyols typically contain about 2 hydroxyl groups per molecule and have an equivalent weight per hydroxyl group of from about 400 to 1500.

Suitable polyesters include reaction products of polyols, preferably diols, with polycarboxylic acids or their anhydrides, preferably dicarboxylic acids or dicarboxylic acid anhydrides. Other suitable polyesters include polymers of cyclic lactones such as polycaprolactone.

Suitable polyols prepared from vegetable oils and animal fats include for example, hydroxymethyl group-containing polyols as described in WO 04/096882 and WO 04/096883; castor oil, so-called "blown" vegetable oils, and polyols prepared by reacting a vegetable oil with an alkanolamine (such as triethanolamine) to form a mixture of monoglycerides, diglycerides, and reaction products of the fatty acid amides, which are ethoxylated to increase reactivity and to provide a somewhat more hydrophilic character. Materials of the last type are described, for example in GB1248919.

Suitable low equivalent weight polyols include materials containing from 2 to 8, especially from 2 to 6 hydroxyl, primary amine or secondary amine groups per molecule and having an equivalent weight of from 30 to about 200, especially from 50 to 125. Examples of such materials include diethanol amine, monoethanol amine, triethanol amine, mono- di- or tri(isopropanol) amine, glycerine, trimethylol propane, pentaerythritol, sorbitol, ethylene glycol, diethylene glycol, 1,2-propylene glycol, dipropylene glycol, tripropylene glycol, ethylene diamine, phenylene diamine, bis(3-chloro-4-aminophenyl)methane and 2,4-diamino-3,5-diethyl toluene.

The polystyrene polymer is soluble in the polyol to the extent of no more than 2% (i.e., 2 grams of thermoplastic polymer in 100 grams of the polyol). The solubility is more preferably no greater than 1% and even more preferably no more than 0.5%. The polystyrene polymer also is preferably non-dispersing, meaning that the polystyrene polymer does not form a stable dispersion in the polyol phase in the absence of a stabilizer.

The polystyrene polymer may be a homopolymer or copolymer of styrene. If a copolymer, polymerized styrene may constitute at least 25%, preferably at least 50%, more preferably at least 75% and especially from 85 to 100% of the weight of the polymer. The polymerized comonomer(s) (if any), (1) are copolymerizable with styrene in block or random fashion, (2) preferably are not highly polar or hydrophilic, and (3) should not be reactive with an alcohol, primary or second amine, or isocyanate group, under the conditions at which the polymer polyol is produced, or under the conditions of a reaction of the polymer polyol with a polyisocyanate to form a polyurethane and/or polyurea polymer. Examples of suitable comonomers include, for example, acrylonitrile, butadiene, methyl methacrylate, butyl acrylate, vinyl acetate and the like.

The polystyrene polymer is thermoplastic. The polystyrene polymer should have a melting or softening temperature of at least 80° C., preferably at least 110° C. and more preferably at least 130° C. However, it must melt or soften enough to be processable at some temperature at which the polyol is liquid and at which the polyol does not thermally degrade.

The molecular weight of the polystyrene polymer is not especially critical, provided that the polymer has the desired melting or softening temperature, and that the melted or softened polymer has a viscosity, at a temperature suitable for making the polymer polyol, that permits the polymer to be dispersed into droplets 100 microns or smaller in diameter. The polystyrene polymer suitably has a melt flow index of from 1 to 20 decigrams/minute, when measured according to ASTM D-1238 at 200° C. under a 5 kg applied load.

The stabilizer is at least in part a copolymer of (1) from 10 to 70% by weight of a branched polyol having a number average molecular weight of from 4000 to 20,000, from 0.2 to about 1 polymerizable ethylenically unsaturated groups per molecule and from about 3 to about 8 hydroxyl groups per molecule with (2) from 30 to 90% by weight of styrene or a mixture of styrene and one or more other low molecular weight monomers. The copolymer preferably is a copolymer of from 10 to 40% by weight of (1) and 60 to 90% by weight of (2). More preferably, it is a copolymer of from 15 to 35%, by weight of (1) and 65 to 85% by weight of (2). "Low molecular weight" monomers have a molecular weight of no greater than 500, preferably no greater than 150.

The copolymer suitably has a number average molecular weight of from about 20,000 to about 300,000.

On a molar basis, the polymerized unsaturated branched polyol is present in very small quantities in the stabilizer. As a result, the copolymer will contain a large number of polymerized styrene units and units of other low molecular weight monomers that may be used, but only a very small number of polymerized unsaturated branched polyol units. On average, the copolymer may contain from about 1 to about 10, especially from 1 to 5, polymerized unsaturated branched polyol units, per molecule. The number of polymerized styrene and other low molecular weight units may number in the hundreds or even thousands. As a result, the copolymer in most cases will contain long blocks of homopolymerized styrene or of styrene copolymerized with another low molecular weight monomer or monomers. Preferably, the copolymer contains at least one such chain of at least 18,000 daltons in mass. Such chain or chains may be terminally or internally positioned within the copolymer molecule. It is believed that the presence of such a chain or chains permits the copolymer to become entangled with molecules of the polystyrene polymer. This is believed to help the copolymer to become attached to the droplets of polystyrene particles and stabilize them.

The ethylenically unsaturated branched polyol is conveniently prepared from a starting branched polyol. The starting branched polyol contains an average of from about 3.5 to about 9 hydroxyl groups per molecule. A preferred starting branched polyol contains from 4 to 8 hydroxyl groups per molecule. For purposes of this invention, the number of hydroxyl groups/molecule are nominal values, which are based on the starting materials used to make the polyol. As is well known, the actual functionality of the polyol is often somewhat lower, particularly for propylene oxide polymers, due to the presence of monofunctional species that form during the polymerization process.

The starting branched polyol is selected together with the polyol(s) that form the continuous phase of the polymer polyol product. The branched polyol should be highly miscible in the continuous phase polyol.

The starting branched polyol preferably has a molecular weight of at least 6000, more preferably at least 8,000. Its molecular weight is preferably up to 16,000. Preferably, the hydroxyl groups in the starting branched polyol are separated from each other by polymer chains having a mass of at least 800 daltons, more preferably at least 1500 daltons. Especially preferred starting branched polyols are "star" polymers, which contain multiple hydroxyl-terminated chains that emanate from a small center.

A preferred starting branched polyol is a polyether, especially a homopolymer or copolymer of propylene oxide. These are prepared by adding an alkylene oxide or mixture of alkylene oxides to an initiator molecule that contains multiple hydroxyl or amino groups. The number of hydroxyl and amino protons on the initiator determines the nominal number of hydroxyl groups/molecule in the starting branched polyol.

Polymerizable ethylenic unsaturation is induced onto the starting branched polyol by capping it with a molecule that has an ethylenically unsaturated group and functional group that reacts with a hydroxyl group to form a covalent bond thereto. Ethylenically unsaturated isocyanates, ethylenically unsaturated siloxanes, ethylenically unsaturated carboxylic acids and ethylenically unsaturated epoxides are suitable capping agents. Specific capping agents include isocyanatoethylmethacrylate, isopropenyl dimethyl benzyl isocyanate and vinyltrimethoxysilane The capping agent and the starting branched polyol are reacted in a ratio of about 0.05 to about 1 mole, preferably from 0.08 to 0.7 mole, of capping agent per mole of starting branched polyol. Higher capping levels can lead to crosslinking in the copolymer. Lower levels lead to a large proportion of the starting branched polyol molecules remaining uncapped and thus unable to participate in the polymerization reaction. This is desirable in cases in which the copolymer is used as a dispersion or mixture with an additional quantity of the starting branched polyol serving as a carrier. The product of the capping reaction is the branched, ethylenically unsaturated polyol, which may be mixed with some amount of uncapped species. Any uncapped species that may be present will form all or part of a carrier material as described below. As some of the hydroxyl groups are consumed in the capping reaction, this product contains somewhat fewer hydroxyl groups per molecule than does the starting branched polyol. The branched, ethylenically unsaturated polyol should contain an average of from 3 to 8 hydroxyl groups per molecule. The number of hydroxyl groups per molecule is calculated by subtracting the number of moles of capping agent per mole of starting branched polyol from the nominal functionality of the starting capped polyol.

Typically, the product of the capping reaction is a mixture of uncapped species which do not contain ethylenic unsaturation, and capped species which do contain the ethylenic unsaturation. The uncapped species may constitute from 0 to 95, preferably from 0 to 70 weight percent of the mixture. A small amount of species containing two or more ethylenically unsaturated groups may also be formed.

An alternative route to making the unsaturated branched polyol is to polymerize an alkylene oxide onto an ethylenically unsaturated alcohol or thiol compound. A branching agent such as glycidol is included in the polymerization reaction to introduce the necessary branching. Generally the branching agent is introduced early in the polymerization, and the alkoxylation reaction is continued in the absence of further branching agent in order to provide a separation of the hydroxyl groups as mentioned above.

The unsaturated branched polyol is then polymerized with styrene, and optionally one or more other low molecular weight monomers as described before, to produce a copolymer. The polymerization is preferably conducted in the presence of a free radical initiator. Temperature conditions are selected in conjunction with the free radical initiator to produce a reasonable reaction rate.

The polymerization can be performed in bulk, but preferably is performed as a mixture or dispersion with a carrier. The carrier may constitute up to about 80%, preferably from about 20 to 80% and more preferably from about 50 to 80%, of the combined weight of the carrier and the monomers. The carrier material may include, for example, the starting branched polyol, and or another polyol. As already mentioned the capped polyol may contain some quantity of the starting branched polyol due to incomplete capping. Alternatively or in addition, more of the starting branched polyol or another polyol can be added during the polymerization step, to help reduce viscosity and/or solvate the product. If another polyol is used as all or part of the carrier, it may have a hydroxyl equivalent weight from 31 to 3,000 or more, and may have from 2 to 8 or more hydroxyl groups per molecule. It should be miscible with the ethylenically unsaturated branched polyol. A preferred polyol carrier material (other than the starting branched polyol) is a polyether polyol having a hydroxyl equivalent weight of from 300 to 2,000.

Alternatively or in addition, the carrier may include one or more compounds having a molecular weight of about 250 or less, which are not polyols, and which are solvents for styrene. Suitable carriers of this type include aromatic hydrocarbons such as toluene, aliphatic hydrocarbons such as hexane, monoalcohols such as ethanol and isopropanol, and ketones such as acetone.

Preferably, at least 50% of weight of the carrier is made up of the starting branched polyol and/or another polyol having a hydroxyl equivalent weight of from 31 to 3,000 or more and having from 2 to 8 or more hydroxyl groups per molecule. Preferably, no more than 50% of the weight of the carrier is made up of a non-polyol solvent for styrene having a molecular weight of 250 or less. The non-polyol solvent, if present at all, more preferably constitutes no more than 40% by weight and even more preferably no more than 30% by weight of the carrier material.

If a low molecular weight non-polyol is used as all or part of the carrier, it should be removed before, during or after the time that the stabilizer is used to make the polymer polyol. Similarly, residual monomers and other volatile polymerization by-products can be removed from the stabilizer before, during or after the polymer polyol is prepared. These materials can be removed by subjecting the stabilizer or the polymer polyol to reduced pressures and/or elevated temperatures, or by various other stripping technologies.

A preferred stabilizer is the reaction product of a mixture containing a) from 5 to 15 weight percent of the ethylenically unsaturated branched polyol;

b) from 15 to 35 weight percent of styrene or a mixture of styrene and one or more other monomers having a molecular weight of 150 or less;

c) from 20 to 80 weight percent of the starting branched polyol and/or at least one other polyol; and d) from 0 to 50% by weight of a non-polyol solvent having a molecular weight of about 250 or less.

A more preferred stabilizer is the reaction product of a mixture containing a) from 5 to 12 weight percent of the ethylenically unsaturated branched polyol;

b) from 18 to 30 weight percent of styrene or a mixture of styrene and one or more other monomers having a molecular weight of 150 or less;

c) from 25 to 77 weight percent of the starting branched polyol and/or at least one other polyol having a hydroxyl equivalent weight of from 300 to 2000; and d) from 0 to 48% by weight of a non-polyol solvent having a molecular weight of about 250 or less.

A still more preferred stabilizer is the reaction product of a mixture containing a) from 5 to 10 weight percent of the ethylenically unsaturated branched polyol;

b) from 20 to 30 weight percent of styrene;

c) from 40 to 75 weight percent of the starting branched polyol; and d) from 0 to 35% by weight of a non-polyol solvent having a molecular weight of about 250 or less.

Suitable free radical initiators include various azo-type initiators as well as peroxy type initiators such as peroxides, peresters, percarbonates and the like. Specific examples of free radical initiators include azobis(isobutyronitrile), t-butyl peroxydiethylacetate, t-amyl peroxy-2-ethylhexanoate, 2,5-dimethyl-2,5-di(t-butylperoxy) hexane and the like. A chain transfer agent may be used to help control the molecular weight. The amount of free radical initiator and chain transfer agent (if any) are selected to produce a copolymer molecule having a molecular weight as described before.

The polymer polyol is made by melting the thermoplastic polystyrene polymer and dispersing the molten polystyrene polymer into a liquid polyol in the presence of the stabilizer. The conditions are sufficient to disperse the polystyrene polymer in the form of droplets within a continuous phase of the liquid polyol. The dispersion is then cooled to solidify the polystyrene polymer droplets to form particles.

Suitable apparatus and methods for making the polymer polyol are described, for example, in U.S. Pat. No. 6,613,827. The apparatus can be any device in which the molten polystyrene polymer can be sheared into droplets in the presence of the polyol and then maintained under agitation or shear until the dispersed droplets can be cooled and solidified. A preferred apparatus is an extruder. The method can be carried out batch-wise, continuously or semi-continuously.

In a preferred process, the melted polystyrene polymer is first mixed with the stabilizer, or a mixture of the stabilizer and a portion of the polyol(s), in a first mixing section of an extruder. The polystyrene polymer may be melted in the first mixing section of the extruder, or in an upstream section of the extruder. Alternatively, the polystyrene polymer may be fed into the extruder as a molten material. In the latter case, the molten polymer may be fed into the extruder through an injection port, a hopper or similar feeding apparatus that can handle a viscous fluid. In preferred embodiments, the polystyrene polymer is melted in a first extruder, and the melt is fed into the barrel of a second extruder where it is used to form the polymer polyol.

By "extruder", it is meant a device having an elongated barrel, an outlet at or near one end of the barrel, mixing elements within the elongated barrel, and a means for pushing a liquid or molten material as essentially a plug flow through the mixing elements, to and out of the outlet. Most typically, the extruder will have one or more longitudinal, rotating screws located within the barrel. The screw or screws are typically designed to perform both the pushing and mixing functions, although it is possible that the screw(s) perform only one or the other of these functions, and some other apparatus performs the other. For example, an extruder barrel can include one or more screws which are designed to push the materials though static mixing elements, where the mixing function is performed. However, the most preferred device is a single- or twin-screw extruder in which the screw or screws include mixing elements.

In the preferred process, the extruder contains at least one injection port within or upstream of the first mixing section. The stabilizer or stabilizer/polyol mixture is introduced into the extruder at the injection port or ports, and is mixed with the molten polystyrene polymer in the first mixing section. It is possible to preblend the polystyrene polymer with the stabilizer or stabilizer/polyol mixture, and introduce the blend into the first mixing section where they are mixed as described below.

In the preferred process, the polystyrene polymer should constitute at least about 35% by weight of the mixture formed in the first mixing section. It is more preferred that the polystyrene polymer constitutes from about 50 to 90% weight percent of the mixture formed in the first mixing section. The stabilizer may constitute from 1 to 35 weight %, preferably from 5 to 25 weight % of the mixture. The weight of the stabilizer in the preceding sentence, and elsewhere herein, includes the combined weight of the copolymer of the unsaturated branched polyol, styrene and any comonomers plus any carrier(s) that are present at the time the stabilizer is added (even though some or all of those carriers may be removed in a subsequent operation). Any polyol added in this section preferably should not constitute more than about 25% of the weight of the mixture.

In the preferred process, the proportions of the components in the first mixing section typically result in the formation of a continuous phase of the polystyrene polymer. The stabilizer may be partially or entirely dissolved in the polystyrene polymer, or may be dispersed as droplets within the polystyrene polymer. If polyol is present in the first mixing section, it tends to form droplets dispersed in the polystyrene phase, in which case the stabilizer molecules tend to concentrate at the boundaries of the polyol and polystyrene phases. Mixing conditions in the first mixing section are therefore chosen to disperse the stabilizer (and polyol if used) into the molten polystyrene polymer.

The temperature of the mixture in the first mixing section is high enough so that the polystyrene polymer remains melted. Most polystyrene polymers are amorphous, and the process temperature in that case is generally above the glass transition temperature, and preferably at least 15° C., more preferably at least 25° C., above the glass transition temperature.

It is often advantageous to use as high a temperature as possible in the first mixing section, consistent with the thermal stability of the various materials, to reduce the melt viscosity of the polystyrene polymer. Temperature conditions that result in significant degradation of the materials are to be avoided. The necessary temperatures in any given case will of course depend on the particular starting materials that are used. It is usually preferable to avoid using a temperature in excess of 80° C. above the crystalline melting or glass transition temperature of the polystyrene polymer.

It is preferred to preheat the stabilizer (and any polyol that may be present), before introducing it into the first mixing section, to a temperature at or near the temperature that is desired in the first mixing section. This helps to prevent localized cool spots and to prevent the melted polystyrene polymer from solidifying locally.

In the preferred process, the resulting mixture of polystyrene polymer, liquid polyol and stabilizer (if any) is then conveyed to a second mixing section, where it is combined with the polyol to form a polymer polyol. Additional stabilizer may be added in this step if desired. "Conveyed" in this context means simply that the mixture is moved downstream in the extruder to a zone where the second mixing step is performed. This is typically performed through the normal operation of the extruder screw or screws, which move the material forward through the extruder in plug flow fashion.

Mixing ratios in the second mixing step are generally such that the polymer polyol formed there contains from about 1 to about 70% by weight, preferably from 15 to 60% by weight, and more preferably from about 25 to 55% by weight of dispersed droplets of the polystyrene polymer. The stabilizer may constitute from 1 to 15 weight percent, preferably from 2 to 10 weight percent, and even more preferably from 4 to 7 weight percent of the polymer polyol. The liquid polyol phase may constitute from 40 to 98 weight percent of the polymer polyol. Preferably, the polyol phase constitutes from 33 to 80% of the weight of the polymer polyol.

In the second mixing section, the polystyrene polymer is formed into droplets that become dispersed in a continuous phase of the liquid polyol. The stabilizer will reside mainly at or near the interface between the polyol phase and the polystyrene polymer droplets.

The mixture is subjected to sufficient shear in the second mixing section to disperse the polystyrene polymer into discrete droplets of the desired size. Generally, the polystyrene polymer is formed into droplets from about 100 nanometers to 100 microns in diameter. A preferred minimum particle size is at least 250 nanometers. A preferred maximum particle size is 20 microns. An especially preferred particle size is from 500 nanometers to 20 microns.

The temperature conditions in the second mixing section are in general as described with respect to the first mixing section. The temperatures are not necessarily identical in the two mixing sections, but they may be. As before, it is preferred to pre-heat the liquid polyol before adding it into the second mixing section, to prevent localized cooling and premature solidification of the polystyrene polymer particles.

The use of the terms "first" and "second" mixing sections are used here only to indicate the relative order of these sections in the preferred process. The description of the mixing sections as "first" and "second" is not intended to exclude the possibility of other mixing steps being performed in the process. It is also possible that either or both of the mixing steps as described can be conducted in a series of two or more distinct sub-steps, in a series of two or more distinct mixing sections of the extruder, or even in multiple devices.

Because the polyol is in most cases a relatively low viscosity material, it is usually necessary to maintain a back-pressure in the extruder to prevent the polyol phase from running out of the extruder before the polystyrene becomes dispersed. The pressure is maintained at 500 kPa or higher, particularly (in the preferred process) in the second mixing section. A preferred pressure is at least 1000 kPa. Pressures in excess of 5000 kPa are generally not necessary and provide little if any additional advantage. A pressure of up to 3000 kPa is more preferred. The pressure in the first mixing section of the preferred process is generally less important, although in most cases the pressure there will be the same as or very close to that of the second mixing section.

Because the extruder operates in essentially a plug flow mode, a convenient way of controlling the pressure in the second mixing section (and the extruder as a whole), is to provide a region of restricted flow downstream of the second mixing section. The region of restricted flow is conveniently located at or near the outlet end of the extruder. The "outlet end" is the portion of the extruder downstream from the second mixing section, through which the polymer polyol product is removed from the extruder.

The region of restricted flow can be generally described as a small cross-section region through which the polymer polyol must flow to be removed from the extruder. The small cross-section limits the rate at which the polymer polyol can flow through at a given pressure. The restriction of flow at this point creates a back-pressure upstream in the second mixing section and in most cases the entire extruder. This pressure is a result of the action of the screws or other motive force pushing the materials through the extruder, against the restriction formed by the small cross-section region. Actual pressures of course will be a function of the cross-section of the region, the viscosity of the polymer polyol, and the applied force.

A preferred apparatus for restricting the flow of the polymer polyol is a back pressure regulator. These back pressure regulators include a conduit or conduits having a variable cross-section. They operate by adjusting the cross-sectional area of the conduit or conduits such that a predetermined pressure is maintained upstream of the back pressure regulator. Many devices of this type are commercially available, include those sold by Fluid Control Systems, Inc., Spartanburg, S.C. under the tradename GO Regulators. The preferred back pressure regulator can be adjusted to provide a predetermined back pressure in the second mixing section (and other portions of the extruder, if desired), and have a high pressure release mechanism which allows excess pressures to be relieved if a predetermined maximum pressure is exceeded.

After the polystyrene polymer has been dispersed into the polyol, the resulting polymer polyol is cooled enough to solidify the dispersed polystyrene polymer droplets to form particles. The polymer polyol should be agitated until the particles have solidified, to prevent agglomeration and/or fouling of equipment. The size of the resulting particles will be very close to that of the droplets before they are cooled, although there may be some small differences due to thermal expansion or contraction or due to a phase change in the case of a crystalline or semi-crystalline polymer. The cooling step can be performed within the extruder or after the polymer polyol is discharged from the extruder. If the polymer polyol is cooled within the extruder, it is preferred to cool it before it reaches the region of restricted flow. This can reduce or prevent fouling of the equipment in that region of the apparatus, and prevent or reduce particle agglomeration from occurring there. Alternatively, the cooling can be done after the polymer polyol is discharged from the extruder, such as passing it through a co- or counter-flow heat exchanger. It is also possible to cool the polymer polyol in a mixing vessel operated at a low temperature in order to quench the discharge from the extruder.

The polymer polyol so produced may be treated to remove volatiles, reaction by-products, unreacted monomers and other impurities. If the stabilizer contained a solvent that was not previously removed, the solvent can be removed from the polymer polyol product at this stage. This is conveniently done by subjecting the polymer polyol to heat and/or a reduced pressure. Temperatures should not be so high as to melt or soften the dispersed particles of the polystyrene polymer.

It is also possible to devolatilize the polymer polyol in a decompression zone of the extruder, before or after the cooling step.

The polymer polyol is useful to make a wide variety of polyurethane and/or polyurea products. The polyurethane and/or polyurea products will be in most instances elastomeric materials that may be non-cellular, microcellular or foamed. Polyurethanes are typically prepared by reacting the polymer polyol or dispersion with a polyisocyanate. The polymer polyol product may be blended with one or more additional polyols, including those types described above, to adjust the solids content to a desired level or provide particular characteristics to the polyurethane. The reaction with the polyisocyanate is performed in the presence of a blowing agent or gas when a cellular product is desired. The reaction may be performed in a closed mold, but in some applications, such as slabstock foam, the reaction mixture is generally permitted to rise more or less freely to form a low density foam material. Generally, the polymer polyol of the invention can be used in the same manner as conventional polymer polyol materials, using the same general types of processes as are used with the conventional materials.

In one embodiment the polymer polyol is blended with one or more additional polyols for the production of polyurethane foam wherein the polymer polyol comprises from 20 to 90 weight percent of the polymer polyol/polyol blend. In further embodiments the polymer polyol comprises at least 25 or 30 weight percent of the polymer/polyol blend. In other embodiments the polymer polyol will comprise less than 90 or less than 81 weight percent of the polymer polyol/polyol blend. Generally when producing a flexible or viscoelastic foam, the polymer polyol is combined with an additional polyol, such polyol will generally have a nominal functionality of 2 to 4 and a hydroxyl number of 20 to 200.

Generally when the polymer polyol is used in producing a rigid or semi-rigid foam, the polymer polyol is combined with a polyol having a nominal functionality of 3 to 8 and a hydroxyl number of 250 to 800.

Suitable polyisocyanates include aromatic, cycloaliphatic and aliphatic isocyanate. Exemplary polyisocyanates include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotolylene diisocyanate, naphthylene-1,5-diisocyanate, 1,3- and/or 1,4-bis(isocyanatomethyl) cyclohexane (including cis- and/or trans isomers) methoxyphenyl-2,4-diisocyanate, diphenylmethane-4,4'-diisocyanate, diphenylmethane-2,4'-diisocyanate, hydrogenated diphenylmethane-4,4'-diisocyanate, hydrogenated diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-diisocyanate, diphenylmethane-2,4'-diisocyanate and mixtures thereof are generically referred to as MDI, and all can be used. Toluene-2,4-diisocyanate, toluene-2,6-diisocyanate and mixtures thereof are generically referred to as TDI, and all can be used.

The amount of polyisocyanate used in making a polyurethane is commonly expressed in terms of isocyanate index, i.e. 100 times the ratio of NCO groups to isocyanate-reactive groups in the reaction mixture (including those provided by water if used as a blowing agent). In the production of conventional slabstock foam, the isocyanate index typically ranges from about 95 to 140, especially from about 105 to 115. In molded and high resiliency slabstock foam, the isocyanate index typically ranges from about 50 to about 150, especially from about 85 to about 110.

A catalyst is often used to promote the polyurethane-forming reaction. The selection of a particular catalyst package may vary somewhat with the particular application, the particular polymer polyol or dispersion that is used, and the other ingredients in the formulation. The catalyst may catalyze the “gelling” reaction between the polyol(s) and the polyisocyanate and/or, in many polyurethane foam formulation(s), the water/polyisocyanate (blowing) reaction which generates urea linkages and free carbon dioxide to expand the foam. In making water-blown foams, it is typical to use a mixture of at least one catalyst that favors the blowing reaction and at least one other that favors the gelling reaction.

A wide variety of materials are known to catalyze polyurethane-forming reactions, including tertiary amines, tertiary phosphines, various metal chelates, acid metal salts, strong bases, various metal alcoholates and phenolates and metal salts of organic acids. Catalysts of most importance are tertiary amine catalysts and organotin catalysts. Examples of tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl) ether, triethylenediamine and dimethylalkylamines where the alkyl group contains from 4 to 18 carbon atoms. Mixtures of these tertiary amine catalysts are often used.

Examples of organotin catalysts are stannic chloride, stannous chloride, stannous octoate, stannous oleate, dimethyltin dilaurate, dibutyltin dilaurate, other organotin compounds of the formula $SnR_n(OR)_{4-n}$, wherein R is alkyl or aryl and n is 0-2, and the like. Organotin catalysts are generally used in conjunction with one or more tertiary amine catalysts, if used at all. Organotin catalysts tend to be strong gelling catalysts, so they are preferably used in small amounts, especially in high resiliency foam formulations. Commercially available organotin catalysts of interest include Dabco™ T-9 and T-95 catalysts (both stannous octoate compositions available from Air Products and Chemicals).

Catalysts are typically used in small amounts, for example, each catalyst being employed from about 0.0015 to about 5% by weight of the high equivalent weight polyol.

When forming a foam, the reaction of the polyisocyanate and the polyol component is conducted in the presence of a blowing agent. Suitable blowing agents include physical blowing agents such as various low-boiling chlorofluorocarbons, fluorocarbons, hydrocarbons and the like. Fluorocarbons and hydrocarbons having low or zero global warming and ozone-depletion potentials are preferred among the physical blowing agents. Chemical blowing agents that decompose or react under the conditions of the polyurethane-forming reaction are also useful. By far the most preferred chemical blowing agent is water, which reacts with isocyanate groups to liberate carbon dioxide and form urea linkages. Water is preferably used as the sole blowing agent, in which case about 1 to about 7, especially from about 2.5 to about 5, parts by weight water are typically used per 100 parts by weight high equivalent weight polyol. Water may also be used in combination with a physical blowing agent, particularly a fluorocarbon or hydrocarbon blowing agent. In addition, a gas such as carbon dioxide, air, nitrogen or argon may be used as the blowing agent in a frothing process. Carbon dioxide can also be used as a liquid or as a supercritical fluid.

A surfactant is also used when a polyurethane foam is prepared. A wide variety of silicone surfactants as are commonly used in making polyurethane foams can be used in making the foams with the polymer polyols or dispersions of this invention. Examples of such silicone surfactants are commercially available under the tradenames Tegostab™ (Th. Goldschmidt and Co.), Niax™ (GE OSi Silicones) and Dabco™ (Air Products and Chemicals).

In addition to the foregoing components, the polyurethane formulation may contain various other optional ingredients such as cell openers; fillers such as calcium carbonate; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; and the like.

In general, a polyurethane foam is prepared by mixing the polyisocyanate and polymer polyol in the presence of the blowing agent, surfactant, catalyst(s) and other optional ingredients as desired, under conditions such that the polyisocyanate and polyol react to form a polyurethane and/or polyurea polymer while the blowing agent generates a gas that expands the reacting mixture. The foam may be formed by the so-called prepolymer method (as described in U.S. Pat. No. 4,390,645, for example), in which a stoichiometric excess of the polyisocyanate is first reacted with the high equivalent weight polyol(s) to form a prepolymer, which is in a second step reacted with a chain extender and/or water to form the desired foam. Frothing methods (as described in U.S. Pat. Nos. 3,755,212; 3,849,156 and 3,821,130, for example), are also suitable. So-called one-shot methods (such as described in U.S. Pat. No. 2,866,744) are preferred. In such one-shot methods, the polyisocyanate and all polyisocyanate-reactive components are simultaneously brought together and caused to react. Three widely used one-shot methods which are suitable for use in this invention include slabstock foam processes, high resiliency slabstock foam processes, and molded foam methods.

The following examples are provided to illustrate the invention, but are not intended to limit the scope thereof. All parts and percentages are by weight unless otherwise indicated.

EXAMPLES 1-13

A 12,000 molecular weight, sorbitol-initiated polyol is reacted with m-isopropenyl-α,α-dimethylbenzyl isocyanate (TMI) at a 1:0.45 mole ratio. This reaction introduces a TMI-capped polyol having terminal vinyl unsaturation on about 40% of the polyol molecules. The product is a mixture of about 60% of the starting branched polyol and 40% of the TMI-capped polyol molecules. The TMI-capped molecules contain about 5 hydroxyl groups/molecule. This reaction product is used to make stabilizers 1-13 using the following general method.

The TMI-capped polyol mixture is copolymerized with styrene in the presence of additional carrier as follows: The TMI-capped polyol mixture and additional carrier, as indicated in Table 1, are charged to a a 3-neck 1 liter round flask with electrical heating, reflux condenser and overhead agitator, and heated to 125° C. A mixture of styrene, 0.1 part of an azo-type free radical initiator and 0.1 part of a mercaptan chain transfer agent are fed in over a period of 120 minutes. After the feed is complete, the mixture is maintained at 125 ° C. for 30 minutes and an additional amount of 0.1 wt % of the azo-type initiator is introduced. The temperature is then maintained at 125° C. for another 40 minutes, after which time the reaction product is cooled to ambient temperature under agitation. The resulting product is a mixture of a copolymer of styrene and the TMI-capped polyol in the carrier. Ratios of starting materials are as indicated in Table 1.

TABLE 1

| | Component (parts by Weight) | | | | |
|---|---|---|---|---|---|
| | | TMI- | Carrier | | |
| Ex. | | Capped | Branched Starting Polyol | | |
| No. | Styrene | Polyol | From Capping Reaction | Additional | Toluene |
| 1 | 15 | 10 | 15 | 0 | 60 |
| 2 | 15 | 10 | 15 | 30 | 30 |
| 3 | 10 | 10 | 15 | 60 | 0 |
| 4 | 17.5 | 9 | 13.5 | 15 | 45 |
| 5 | 17.5 | 9 | 13.5 | 45 | 15 |
| 6 | 20 | 8 | 12 | 0 | 60 |
| 7 | 20 | 8 | 12 | 30 | 30 |
| 8 | 20 | 8 | 12 | 60 | 0 |
| 9 | 22.5 | 7 | 10.5 | 15 | 45 |
| 10 | 22.5 | 7 | 10.5 | 45 | 15 |
| 11 | 25 | 6 | 9 | 0 | 60 |
| 12 | 25 | 6 | 9 | 30 | 30 |
| 13 | 25 | 6 | 9 | 60 | 0 |

The ability of stabilizer examples 1-13 to stabilize polystyrene particles in a polyether polyol is evaluated as follows:

30 parts of polystyrene (melt flow index of 39 g/10 minutes at 200° C., 5 kg, $M_w$ 145,000 Da.), 10 parts of a stabilizer from Table 1 and 60 parts of a 3000 molecular weight trifunctional random copolymer of 11% ethylene oxide and 89% propylene oxide) are mixed in a 500 mL stainless steel reactor, equipped with a Cowles turbine mixer running at 2500 rpm. The mixing is performed at 190° C. under nitrogen atmosphere for 40 minutes. The resulting dispersion is then cooled with constant agitation to a temperature well below the $T_g$ of the polystyrene polymer (80° C.). The size of the particles is measured, and serves as an indication of the stabilizer activity in this particular system.

TABLE 2

| Stablizer from Example No. | Particle Size Part. Size D[3,2] micron |
|---|---|
| 1 | large |
| 2 | large |
| 3 | 38 |
| 4 | large |
| 5 | 42 |
| 6 | large |
| 7 | 81 |
| 8 | 14 |
| 9 | 79 |
| 10 | 38 |
| 11 | large |
| 12 | 66 |
| 13 | 9 |

The results in Table 2 indicate that the various stabilizers have differing abilities to stabilize particles in this particular system. Some general trends are indicated. Stabilizers that use larger proportions of the starting branched polyol as the carrier tend to give better results. This is seen by comparing the results of Example 3 with those of Examples 1 and 2, Example 5 with Example 4, Examples 7 and 8 with Example 6, and Examples 12 and 13 with Example 11. In addition, stabilizers that have a 70% or more by weight styrene units in the copolymer also tend to perform better. This can be seen by comparing, for instance, Examples 8 and 13 with Example 3.

EXAMPLE 14

Polystyrene (Styron PS640, from The Dow Chemical Company) is melted in a single screw extruder at 210° C. and fed continuously into one end of a 25-mm Clextral co-rotating twin screw extruder having a length/diameter ratio of 38. The twin screw extruder includes, in order a first mixing section, which is maintained at a set temperature of 200° C., a second mixing section, which is maintained at a set temperature of 190° C., and a cooling section having a set temperature of 180° C. The outlet end of the twin screw extruder is fitted with a back pressure regulator (GO BP-60 from Fluid Control Systems, Inc., Spartanburg, S.C.), which, together with the action of the screws, creates and maintains a pressure of 1000-2000 kPa in the twin screw extruder.

A mixture of the stabilizer from Example 3 and a 3000 molecular weight trifunctional random copolymer of 11% ethylene oxide and 89% propylene oxide is fed into the twin-screw extruder at the start of the mixing section. The feed rate is sufficient to provide from 4 to 7 weight percent of the stabilizer, based on the weight of the final polymer polyol product. The polystyrene and the polyol/stabilizer mixture are mixed by the action of the rotating screws and moved down the extruder barrel, where a more of the 3000 molecular weight polyol is metered in, at a rate sufficient to produce a polymer polyol having 35-40% dispersed polystyrene particles. The materials are mixed and sheared in the second mixing section to form the polystyrene into droplets dispersed in a continuous polyol phase. The resulting dispersion then passes through a cooling section and then through the restricted cross-sectional area provided by the back pressure regulator, and out of the extruder into a stirred tank where is cooled with stiffing. The dispersed polystyrene particles solidify in the stirred tank to form the polymer polyol. The resulting polymer polyol had a volume average particles size of 7.9 micron (as measured with a Coulter LS230 particle size measurement instrument), 35 wt % solids and a viscosity of 6350 mPas.

EXAMPLES 15-18

A mechanically dispersed polymer polyol (mCPP) is prepared by feeding stabilizer, polyol and polystyrene granulates into a ZSK-25 extruder. (Twin screw extruder, 25 mm screw diameter). The polyol and stabilizer are fed through separate heated lines and polystyrene granulates are fed from a hopper. The polystyrene granulates (Styron 640) are fed to the extruder barrel (heated to 200 ° C. and rotating at 500 rpm) at a rate of 2.1 kg/hr. At approx. one third of the extruder barrel length, stabilizer, prepared as per example 8, is fed at 2.1 kg/hr and 90 ° C. The formed dispersion is diluted with a glycerin initiated polyoxypropylene-polyoxyethylene capped polyol (VORANOL™ CP 4735 polyol available from The Dow Chemical Company), injected at a rate of 2.8 kg/hr at 160 ° C. at approx. two thirds of the extruder barrel length. The copolymer polyol product exits the extruder die at 7 kg/hr and is collected through the product handling section and cooled down to room temperature while stiffing. The dispersions is stable for extended periods of time.

The polymer polyol characteristics are: 35.9 wt % solids, average particle size 4.0-4.5 μm and viscosity of 7400 mPa·s at 25 ° C.

Polyurethane foams are made on the bench, using hand-mix procedure and blends based on about 200 grams polyol. Initially polyols, water, catalysts and surfactant are weighed in a plastic cup. In order to avoid risk of hydrolysis, the tin catalyst is added just before mixing the components for 30 seconds at 2,000 RPM. Immediately after the desired amount of isocyanate is added, the mixture is mixed for 5 seconds and the reactants then poured into a 20×20×20 cm cardboard box and allowed to free rise. All products were at 25° C.

The foam is cured at room temperature for at least 48 hours before testing of properties. Testing of the foam is done according to the following test methods.

| Test | Procedure | Unit |
|---|---|---|
| Density | ASTM D 3574-95 | Kg/m3 |
| Airflow | ASTM D 3574-95 | cfm (cubic foot per minute) |
| CFD hardness | Peugeot D 41-1003-86 | KPa |
| Resiliency | ASTM D 3574-95 | % |
| Compression set | ASTM D 3574-95 | % CD (Under deflection) |

The formulation and properties of foam produced using polymer polyols of the present invention are given in Table 3. Formulations and properties of comparable foams are given in Table 4. In the tables the following components are used.

SPECFLEX™ NC 632 polyol is a sorbitol/glycerin initiated polyoxypropylene-polyoxyethylene polyol having a hydroxyl number of approximately 32.5 available from The Dow Chemical Company (TDCC). SPECFLEX™ NC 700 polyol is a copolymer polyol having a solids content of approximately 40% available form TDCC. Specflex is a trademark of TDCC.

DEOE is diethanolamine. DABCO™ 33LV, NIAX™ A-1 and NIAX™ A-300 are amine catlysts. TEGOSTAB B-8715LF and TEGOSTAB B-8719 LF are silicone surfactants. The isocyante used is a blend of 20% polymeric diphenylmethane diisocyanate (pMDI) and 80% toluene diisocyante, available as SPECFLEX™ TM 20 from TDCC.

TABLE 3

| | Example 15 | Example 16 | Example 17 | Example 18 |
|---|---|---|---|---|
| Specflex NC 632 | 67 | 56 | 44 | 56 |
| mCPP | 33 | 44 | 56 | 44 |
| Water | 3.0 | 3.0 | 3.0 | 3.0 |
| DEOA 99% | 0.7 | 0.7 | 0.7 | 0.7 |
| Dabco 33 LV | 0.3 | 0.3 | 0.3 | 0.3 |
| Niax A-1 | 0.05 | 0.05 | 0.05 | 0.06 |
| Niax A-300 | 0.1 | 0.1 | 0.1 | 0.1 |
| Tegostab B-8715 LF | 0.5 | 0.5 | 0.5 | 0.5 |
| Tegostab B-8719 LF | 0.2 | 0.2 | 0.2 | 0.2 |
| Isocyanate index | 100 | 100 | 100 | 100 |

TABLE 3-continued

| | Example 15 | Example 16 | Example 17 | Example 18 |
|---|---|---|---|---|
| Mold exit time (s) | 33 | 34 | 32 | Free Rise |
| Demolding time (min) | 5 | 5 | 5 | |
| Part weight (g) | 426 | 425 | 433 | |
| Comments | OK | OK | OK | Good foam Cured 5' at 120 deg C. |
| Core density | 44.1 | 42.8 | 45.1 | 32.7 |
| 50% CFD (KPa) | 6.6 | 7.1 | 9.1 | 3.3 |
| Airflow (cfm) | 4.1 | 3.7 | 2.9 | 3.8 |
| Resiliency ASTM % | 66 | 66 | 61 | 60 |
| 50% CS (% CD) | 9.5 | 10.3 | 11.4 | |
| 75% CS (% CD) | 7.8 | 8.1 | 9.8 | |
| 70% Wet CS skin % | 19.9 | 23.3 | 26.0 | |
| Tensile Strength (KPa) | 128 | 119 | 135 | |
| Elongation (%) | 93 | 85 | 80 | |

TABLE 4

| | C1 | C2 | C3 | C4 |
|---|---|---|---|---|
| Specflex NC 632 | 70 | 60 | 50 | 50 |
| Specflex NC 700 | 30 | 40 | 50 | 50 |
| Water | 3.0 | 3.0 | 3.0 | 3.0 |
| DEOA 99% | 0.7 | 0.7 | 0.7 | 0.7 |
| Dabco 33 LV | 0.3 | 0.3 | 0.3 | 0.3 |
| Niax A-1 | 0.05 | 0.05 | 0.05 | 0.05 |
| Niax A-300 | 0.1 | 0.1 | 0.1 | 0.1 |
| Tegostab B-8715 LF | 0.5 | 1.0 | 1.0 | 0.5 |
| Tegostab B-8719 LF | 0.2 | 0.6 | 0.6 | 0.2 |
| Isocyanate index | 100 | 100 | 100 | 100 |
| Mold exit time (s) | 37 | 36 | 35 | |
| Demolding time (min) | 4 | 4 | 4 | |
| Part weight (g) | 435 | 458 | 456 | |
| Comments | Large cells | OK | OK | Sponge |
| Core density | 44.7 | 46.6 | 46.8 | |
| 50% CFD (KPa) | 6.5 | 8.4 | 8.8 | |
| Airflow (cfm) | 4.0 | 2.8 | 2.4 | |
| Resiliency ASTM % | 65 | 62 | 62 | |
| 50% CS (% CD) | 8.4 | 8.9 | 10.3 | |
| 75% CS (% CD) | 6.8 | 7.9 | 8.4 | |
| 70% Wet CS skin % | 12.0 | 22.8 | 24.5 | |
| Tensile Strength (KPa) | 152 | 173 | 195 | |
| Elongation (%) | 98 | 92 | 98 | |

The results indicate the polymer polyols of the present invention give increased hardness with higher amounts of solids, comparable as to controls based on a commercial polymer polyol based on in-situ polymerization.

Unexpectedly the polymer polyols of the present invention require less silicone surfactant than the control. Furthermore the foams produced using the polymer polyols of the present invention give foam with good physical properties.

What is claimed is:

1. A method for making a polymer polyol, comprising (a) mixing a melted thermoplastic polystyrene polymer with a liquid polyol in the presence of a stabilizer under conditions sufficient to disperse the polystyrene polymer in the form of droplets within a continuous phase of the liquid polyol and (b) cooling the polymer polyol to solidify the polystyrene polymer, wherein the stabilizer includes a copolymer of (1) from 10 to 70% by weight of an unsaturated branched polyol which has a molecular weight of from 4000 to 20,000, from 0.2 to about 1.2 polymerizable ethylenically unsaturated groups per molecule and from about 3 to about 8 hydroxyl groups per molecule with (2) from 30 to 90% by weight of styrene or a mixture of styrene and one or more other low molecular weight monomers.

2. The method of claim 1, wherein the polymer polyol contains from about 2 to 10 weight percent of the stabilizer.

3. The method of claim 1, wherein the stabilizer includes a copolymer of (1) from 10 to 40% by weight of an unsaturated branched polyol having a molecular weight of from 4000 to 20,000, from 0.2 to about 1.2 polymerizable ethylenically unsaturated groups per molecule and from about 3 to about 8 hydroxyl groups per molecule with (2) from 60 to 90% by weight of styrene or a mixture of styrene and one or more other low molecular weight monomers.

4. The method of claim 1, wherein the stabilizer further includes a carrier in which the copolymer is mixed or dispersed.

5. The method of claim 4, wherein the copolymer constitutes from 20 to 80 weight percent of the stabilizer.

6. A copolymer of (1) from 10 to 70% by weight of an unsaturated branched polyol which has a molecular weight of from 4000 to 20,000, from 0.4 to about 1.2 polymerizable ethylenically unsaturated polymerizable groups per molecule and from about 3 to about 8 hydroxyl groups per molecule with (2) from 30 to 90% by weight of styrene or a mixture of styrene and one or more other low molecular weight monomers.

7. The copolymer of claim 6, which has a molecular weight of from 20,000 to 300,000.

8. The copolymer of claim 6, which contains from 1 to 5 branched polyol repeating units.

9. A mixture of from 20 to 80% of A) the copolymer of claim 6 in B) from 80 to 20% of one or more carriers.

* * * * *